US012476099B2

(12) United States Patent
Toji

(10) Patent No.: US 12,476,099 B2
(45) Date of Patent: Nov. 18, 2025

(54) ION ANALYZER

(71) Applicant: SHIMADZU CORPORATION, Kyoto (JP)

(72) Inventor: Yohei Toji, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 368 days.

(21) Appl. No.: 17/919,772

(22) PCT Filed: Apr. 24, 2020

(86) PCT No.: PCT/JP2020/017639
§ 371 (c)(1),
(2) Date: Oct. 19, 2022

(87) PCT Pub. No.: WO2021/214965
PCT Pub. Date: Oct. 28, 2021

(65) Prior Publication Data
US 2023/0197432 A1 Jun. 22, 2023

(51) Int. Cl.
*H01J 49/16* (2006.01)

(52) U.S. Cl.
CPC .................................. *H01J 49/167* (2013.01)

(58) Field of Classification Search
None
See application file for complete search history.

(56) References Cited

U.S. PATENT DOCUMENTS 4,859,848 A * 8/1989 Bowman ................. H01J 49/32 250/296
5,925,266 A * 7/1999 Gagne ...................... H05H 1/30 219/121.48
8,513,596 B2 * 8/2013 Kang .................... H01J 49/045 250/288

(Continued)

FOREIGN PATENT DOCUMENTS

JP 08-195185 A 7/1996
JP 2009294086 A * 12/2009
WO 2018/078693 A1 5/2018

OTHER PUBLICATIONS

English machine translation for JP-2009294086-A (Year: 2009).*

(Continued)

*Primary Examiner* — Robert H Kim
*Assistant Examiner* — Alina Kaliszewski
(74) *Attorney, Agent, or Firm* — Sughrue Mion, PLLC

(57) ABSTRACT

An ion analyzer 1 including: a first member 16 fixed to an ion outflow port and provided with a fixing pin 1621 on one side and a pin hole 1631 on the other side sandwiching the ion outflow port; a second member 12 to be fixed to the first member and including an ion flow controller 121 configured to control movement of ions flowing out from the ion outflow port, the second member having a first concave part 1231 configured to engage with the fixing pin from a first direction perpendicular to an axis of the fixing pin, and a second concave part 1241 configured to engage with an insertion pin to be inserted into the pin hole from a second direction different from the first direction; and a pin member 17 having an insertion pin 172 inserted into the pin hole and a head part 171 configured to sandwich and fix the second concave part with the first member.

7 Claims, 6 Drawing Sheets

(56) References Cited

U.S. PATENT DOCUMENTS

| | | | | |
|---|---|---|---|---|
| 2011/0089333 | A1* | 4/2011 | Ferrara | H01J 3/38 250/396 R |
| 2013/0015347 | A1* | 1/2013 | Steiner | H01J 49/063 250/288 |
| 2017/0294296 | A1* | 10/2017 | Trivett | H01J 49/0404 |
| 2018/0286654 | A1* | 10/2018 | Knutas | H01J 49/068 |
| 2019/0252178 | A1 | 8/2019 | Nishiguchi | |
| 2020/0381236 | A1* | 12/2020 | Ueda | H01J 49/063 |
| 2021/0111015 | A1* | 4/2021 | Miura | H01J 49/408 |
| 2021/0175064 | A1* | 6/2021 | Murata | G01N 27/623 |

OTHER PUBLICATIONS

Japanese Office Action dated Jun. 6, 2023 in Japanese Application No. 2022-516785.

International Search Report of PCT/JP2020/017639 dated Jun. 30, 2020 [PCT/ISA/210].

Written Opinion of PCT/JP2020/017639 dated Jun. 30, 2020 [PCT/ISA/237].

Chinese Office Action dated Apr. 7, 2025 in Application No. 202080097815.X.

* cited by examiner

ION ANALYZER

CROSS REFERENCE TO RELATED APPLICATIONS

This application is a National Stage of International Application No. PCT/JP2020/017639, filed Apr. 24, 2020.

TECHNICAL FIELD

The present invention relates to an ion analyzer.

BACKGROUND ART

One of devices for analyzing a substance contained in a liquid sample is a liquid chromatograph mass spectrometer. In the liquid chromatograph mass spectrometer, a liquid sample is introduced into a column of a liquid chromatograph on a flow of a mobile phase, and a target substance is separated from other substances inside the column. The target substance flowing out of the column is ionized by an ionization source of the mass spectrometer, and then separated according to the mass-to-charge ratio in a mass spectrometry section and measured.

As an ionization source of the mass spectrometer, for example, an electrospray ionization (ESI) source is used. The ESI source is one of atmospheric pressure ionization sources that ionize a target substance in an atmospheric pressure atmosphere. In the ESI source, the liquid sample is charged, and the charged liquid sample is sprayed with a nebulizer gas and is nebulized in the ionization chamber. The charged droplets nebulized in the ionization chamber are split due to charge repulsion inside the droplets and vaporization (desolvation) of the mobile phase creates ions.

In the mass spectrometer, when a droplet containing a large amount of neutral molecules derived from a mobile phase, for example, other than ions derived from a target substance, enters the mass spectrometry section, the mass spectrometry section is contaminated. Therefore, in many ESI sources, an arrangement of an ESI nozzle and an ion introduction unit is determined such that a direction in which charged droplets are sprayed from the ESI nozzle and a direction in which ions are introduced from the ionization chamber to the mass spectrometry section are orthogonal to each other. Ions generated in the ionization chamber are taken into the mass spectrometry section on a gas flow generated by a differential pressure between the ionization chamber at atmospheric pressure and the mass spectrometry section at vacuum.

Patent Literature 1 describes a configuration for enhancing an intake efficiency of ions into a mass spectrometry section in an ESI source having the above configuration. The ESI source includes a ground electrode having an opening through which a jet from the ESI nozzle passes, a convergence electrode having an opening surrounding an ion intake port from the ionization chamber to the mass spectrometry section, and a push electrode disposed on an opposite side of the convergence electrode across the jet from the ESI nozzle. A first voltage having the same polarity as that of the ion to be measured is applied to the push electrode. Further, a second voltage having the same polarity as that of the ion to be measured and having an absolute value smaller than that of the first voltage is applied to the convergence electrode. After passing through the opening of the ground electrode, ions contained in the jet emitted from the ESI nozzle are pushed toward the convergence electrode by a potential gradient from the push electrode toward the convergence electrode, and in the vicinity of the convergence electrode, the ions are converged to the ion intake port by a potential gradient from the convergence electrode toward the ion intake port. On the other hand, neutral molecules are not affected by the potential gradient. Therefore, it is possible to enhance the intake efficiency of ions derived from the target substance while suppressing the neutral molecules derived from the mobile phase or the like from entering the mass spectrometry section and contaminating the mass spectrometry section.

CITATION LIST

Patent Literature

Patent Literature 1: WO 2018/078693 A

SUMMARY OF INVENTION

Technical Problem

Although Patent Literature 1 describes that three electrodes of the ground electrode, the convergence electrode, and the push electrode are disposed in the ionization chamber, but a specific method of actually fixing these electrodes in the ionization chamber is not described. Among these electrodes, the ground electrode disposed at the closest position to the ESI nozzle needs to be removed and cleaned at an appropriate time because contamination of a surface of the ground electrode increases due to the jet from the ESI nozzle after repeating the analysis of the liquid sample. Further, since these electrodes form an electric field that induces ions toward the ion intake port in the ionization chamber, high accuracy is required for a mutual positional relationship in order to obtain a high ion intake efficiency. Therefore, a technique for easily attaching and detaching the electrodes with high position reproducibility is required.

Here, the ESI source of the mass spectrometer has been described as a specific example, but the same technique as described above is required in various situations in which electrodes to which a voltage for controlling the behavior of ions is applied are disposed in a limited space inside an ion analyzer.

A problem to be solved by the present invention is to provide a technique capable of easily attaching and detaching electrodes with high position reproducibility even in a narrow space.

Solution to Problem

An ion analyzer according to the present invention made to solve the above problems includes:

a first member fixed to an ion outflow port and provided with a fixing pin on one side and a pin hole on the other side sandwiching the ion outflow port;

a second member to be fixed to the first member, the second member including an ion flow controller configured to control movement of ions flowing out from the ion outflow port, the second member having a first concave part configured to engage with the fixing pin from a first direction perpendicular to an axis of the fixing pin, and a second concave part configured to engage with an insertion pin to be inserted into the pin hole from a second direction different from the first direction; and a pin member having the insertion pin to be inserted into the pin hole, and a head part configured to sandwich and fix the second concave part with the first member.

Advantageous Effects of Invention

In the ion analyzer according to the present invention, the second member including the ion flow controller is attached to the first member fixed to the ion outflow port, and the movement of the ions flowing out from the ion outflow port is controlled by the ion flow controller. The ion flow controller is typically an electrode member.

When the second member is attached to the first member, the insertion pin of the pin member is inserted into the pin hole of the first member in advance. Then, the first concave part of the second member is engaged with the fixing pin of the first member from the first direction perpendicular to the axis of the fixing pin, and the second concave part of the second member is engaged with the insertion pin of the pin member from the second direction different from the first direction. These operations can be performed by one operation of sliding the second member close to the first member. Finally, the second concave part of the second member is sandwiched and fixed between the first member and the head of the pin member.

In the ion analyzer according to the present invention, the first concave part of the second member is engaged with the fixing pin of the first member, and the second concave part of the second member is engaged with the insertion pin of the pin member, whereby the positioning is performed in a plane orthogonal to the fixing pin and the insertion pin. Then, the second concave part of the second member is sandwiched and fixed between the head part of the pin member and the first member, whereby the positioning is performed in one direction orthogonal to the plane. Therefore, the ion flow controller can be fixed with high position reproducibility. Further, the second member can be easily attached only by sliding the second member close to the first member and fixing the second member with the pin member, and the second member can be easily detached only by loosening the pin member and sliding the second member to separate the second member from the first member.

DESCRIPTION OF EMBODIMENTS

A mass spectrometer that is an embodiment of an ion analyzer according to the present invention will be described below with reference to the drawings.

Figure 1:
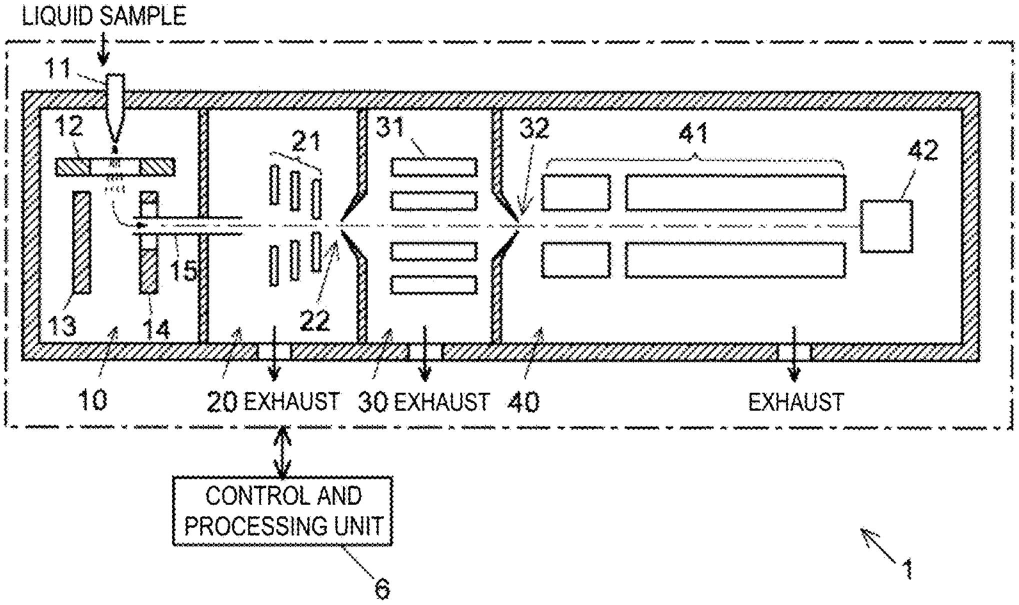
FIG. 1 is a schematic configuration diagram of a mass spectrometer which is an embodiment of an ion analyzer according to the present invention.

FIG. 1 is a configuration diagram of a main part of the mass spectrometer 1 of the present embodiment. The mass spectrometer 1 of the present embodiment includes an ionization chamber 10, a first intermediate vacuum chamber 20, a second intermediate vacuum chamber 30, and an analysis chamber 40. The inside of the ionization chamber 10 is a substantially atmospheric pressure atmosphere. The inside of the analysis chamber 40 is evacuated to a high vacuum state of, for example, about $10^{-3}$ to $10^{-4}$ Pa by a high-performance vacuum pump (not illustrated). The first intermediate vacuum chamber 20 and the second intermediate vacuum chamber 30 sandwiched between the ionization chamber 10 and the analysis chamber 40 are also evacuated by a vacuum pump (not illustrated), and have a configuration of a multi-stage differential exhaust system in which a degree of vacuum is increased stepwise from the ionization chamber 10 toward the analysis chamber 40.

Figure 2:
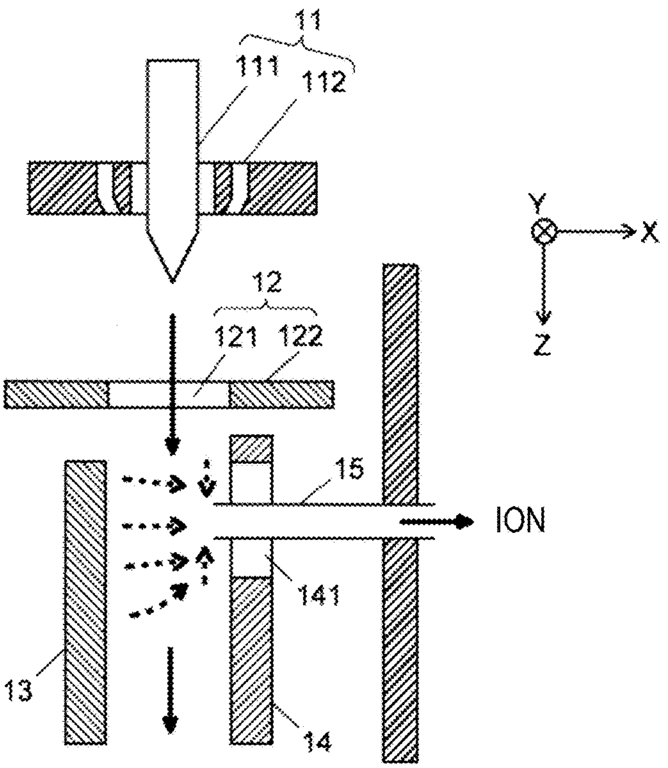
FIG. 2 is a diagram for explaining a configuration of an ionization source of the mass spectrometer of the present embodiment.

An ESI ionization probe 11 is disposed in the ionization chamber 10. As schematically illustrated in FIG. 2, the ESI ionization probe 11 includes an ESI nozzle 111 (ion outflow port) and an assist gas nozzle 112. An ESI nozzle 111 applies a predetermined high voltage (ESI voltage) to a liquid sample and sprays a nebulizer gas to the charged liquid sample to nebulize the liquid sample into the ionization chamber 10 as charged droplets.

A heating gas is supplied to an assist gas nozzle 112. The heating gas promotes vaporization (desolvation) of a mobile phase contained in the liquid sample nebulized from the ESI nozzle 111. The charged droplet nebulized from the ESI ionization probe 11 comes into contact with the surrounding atmosphere to be refined, and a sample component protrudes with a charge to become an ion in a process in which a solvent such as a mobile phase evaporates from the droplet. A ground electrode 12, a push electrode 13, and a convergence electrode 14 are disposed in front of a nebulization flow from the ESI ionization probe 11. The ground electrode 12 is grounded, and a predetermined DC voltage is applied from a power supply (not illustrated) to the push electrode 13 and the convergence electrode 14.

The ionization chamber 10 and the first intermediate vacuum chamber 20 communicate with each other by a heated capillary 15 having a small diameter. Since there is a pressure difference between both opening ends of the heated capillary 15, a gas flow flowing from the ionization chamber 10 to the first intermediate vacuum chamber 20 is formed by the pressure difference. Ions generated in the ionization chamber 10 are sucked into the heated capillary 15 along with the flow of the gas flow, and are introduced into the first intermediate vacuum chamber 20 together with the gas flow from an outlet end thereof.

A partition wall separating the first intermediate vacuum chamber 20 and the second intermediate vacuum chamber 30 is provided with a skimmer 22 having a small-diameter opening at a top of the partition wall. An ion guide 21 including a plurality of ring-shaped electrodes arranged to surround an ion optical axis is disposed in the first intermediate vacuum chamber 20. The ions introduced into the first intermediate vacuum chamber 20 are converged in the vicinity of an opening of the skimmer 22 by the action of an electric field formed by the ion guide 21, and are sent into the second intermediate vacuum chamber 30 through the opening.

In the second intermediate vacuum chamber 30, a multipole (for example, an octupole) type ion guide 31 including a plurality of rod electrodes is disposed. The ions are converged by the action of a radio-frequency electric field formed by the ion guide 31, and are sent into the analysis chamber 40 through an opening of a skimmer 32 provided in the partition wall separating the second intermediate vacuum chamber 30 and the analysis chamber 40.

In the analysis chamber 40, a quadrupole mass filter 41 and an ion detector 42 are disposed. The ions introduced into the analysis chamber 40 are introduced into the quadrupole mass filter 41, and only ions having a specific mass-to-charge ratio pass through the quadrupole mass filter 41 and reach the ion detector 42 by the action of an electric field formed by a radio-frequency voltage and a direct-current voltage applied to the quadrupole mass filter 41. An ion detector 42 generates a detection signal corresponding to an amount of reached ions, and outputs the detection signal to a control and processing unit 6.

The control and processing unit 6 controls a measurement operation of each unit described above, and performs processing such as creating mass spectrum data on the basis of the detection signal output from the ion detector 42.

A configuration of the ionization chamber 10 will be described in more detail with reference to FIG. 2. In the following description, for convenience, a blowing direction along a central axis of the nebulization flow from the ESI ionization probe 11 is defined as a Z-axis direction, an ion intake direction along a central axis of the heated capillary 15 orthogonal to the Z-axis direction is defined as an X-axis direction, and a direction orthogonal to the X-axis direction and the Z-axis direction is defined as a Y-axis direction.

In the ionization chamber 10, the ground electrode 12 is disposed at a position closest to the ESI ionization probe 11. The ground electrode 12 is an electrode having a plate-shaped main body part 122 parallel to an X-Y plane, and has an opening part 121 centered on the central axis of the nebulization flow from the ESI ionization probe 11.

The convergence electrode 14 is disposed at an end part of the heated capillary 15 on an inlet side. The convergence electrode 14 is a flat plate-shaped electrode parallel to a Y-Z plane, and has an opening 141 formed to surround the end part on the inlet side of the heated capillary 15.

The flat plate-shaped push electrode 13 parallel to the Y-Z plane is disposed to face an inlet end of the heated capillary 15 and the convergence electrode 14 across the nebulization flow. That is, the nebulization flow from the ESI ionization probe 11 passes through the opening part 121 (ion flow controller) of the ground electrode 12 and then enters a space between the push electrode 13 and the convergence electrode 14. the push electrode 13 from a power supply (not illustrated). Further, a second voltage having the same polarity as that of the ion to be analyzed and having an absolute value smaller than that of the first voltage is also applied to the convergence electrode 14 from a power supply (not illustrated). The ground electrode 12 and the heated capillary 15 are grounded.

The ions that have entered the space between the push electrode 13 and the convergence electrode 14 are pushed out from the push electrode 13 toward the convergence electrode 14 by an electric field formed by a potential difference between the first voltage and the second voltage. Further, in the vicinity of the convergence electrode 14, ions are converged toward the inlet end of the heated capillary 15 and introduced into the heated capillary 15.

The ion analyzer of the present embodiment is characterized in the configuration by which that the ground electrode 12 is attached to and detached from an auxiliary member 16. The attaching and detaching mechanism of the ground electrode 12 will be described with reference to FIGS. 3 to 11. The ground electrode 12 of the present embodiment is fixed to the auxiliary member 16 fixed to the ESI ionization probe 11 by a pin member 17. That is, the auxiliary member 16 corresponds to a first member in the present invention, and the ground electrode 12 corresponds to a second member in the present invention.

Figure 3:
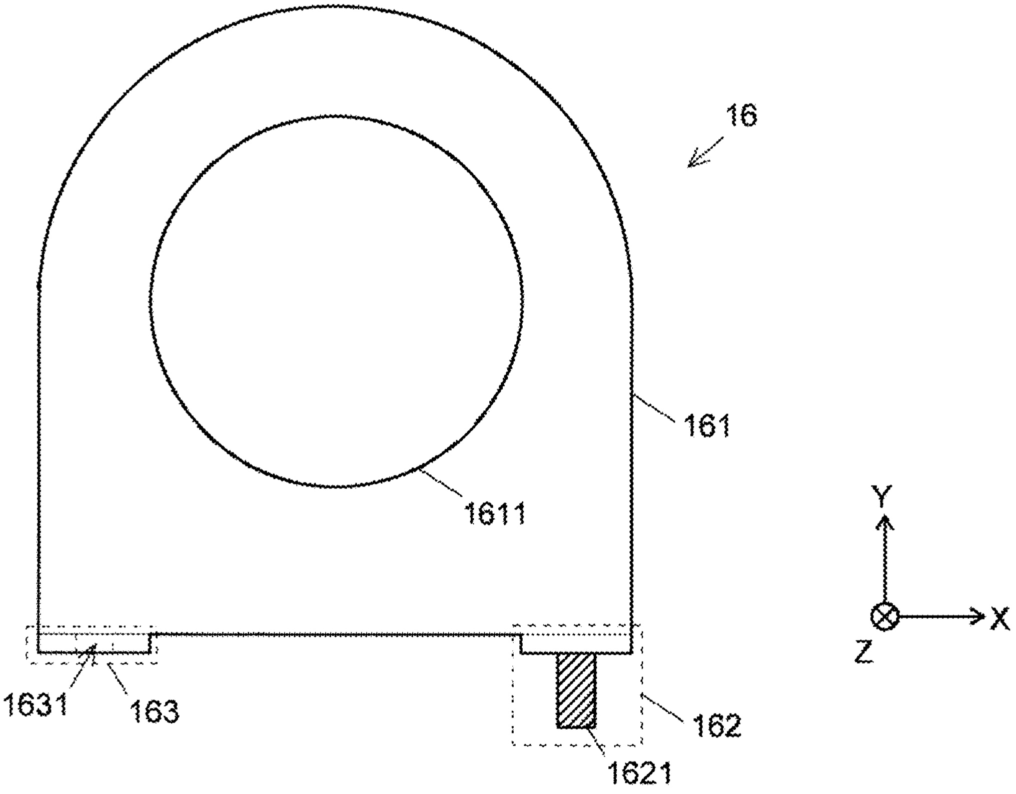
FIG. 3 is an X-Y plan view of an auxiliary member in the present embodiment.
Figure 4:
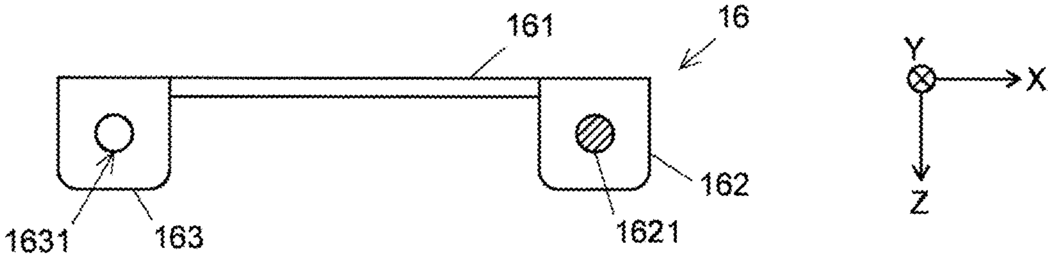
FIG. 4 is an X-Z side view of the auxiliary member in the present embodiment.
Figure 5:
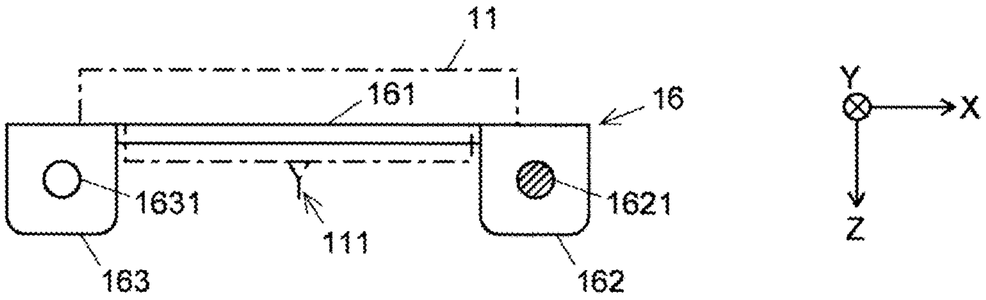
FIG. 5 is an X-Z side view in a state where the auxiliary member in the present embodiment is attached to an ESI ionization probe.

First, a configuration of the auxiliary member 16 will be described. FIG. 3 is an X-Y plan view of the auxiliary member 16, FIG. 4 is an X-Z side view of the auxiliary member 16, and FIG. 5 is an X-Z side view in a state where the auxiliary member 16 is attached to the ESI ionization probe 11.

The auxiliary member 16 includes a flat plate-shaped main body part 161. The main body part 161 has a half disc shape and a remaining half rectangular plate shape. An opening 1611 for attachment to the ESI ionization probe 11 is formed at a center of the main body part 161. A first extension part 162 and a second extension part 163 are provided on one side opposite to the disk-shaped part of the rectangular plate-shaped part of the main body part 161. Each of the first extension part 162 and the second extension part 163 is a flat plate-shaped small piece. A fixing pin 1621 is disposed at a center of the first extension part 162 toward the outside of the main body part 161. An opening part 1631 is formed at a center of the second extension part 163. A thread groove corresponding to a thread of an insertion pin 172 of the pin member 17 to be described later is formed on an inner peripheral surface of the opening part 1631.

The ESI ionization probe 11 is fixed to a chamber of the ionization chamber 10, as shown in FIG. 1. As illustrated in FIG. 5, the ESI ionization probe 11 is fixed such that a tip of the ESI nozzle 111 is positioned vertically downward. The auxiliary member 16 is fixed at a position near a tip of the ESI ionization probe 11 in a direction in which the flat plate-shaped main body part 161 is horizontal. The auxiliary member 16 is a member made of a conductive material (for example, stainless steel), and is grounded while being fixed to the ESI ionization probe 11.

Figure 6:
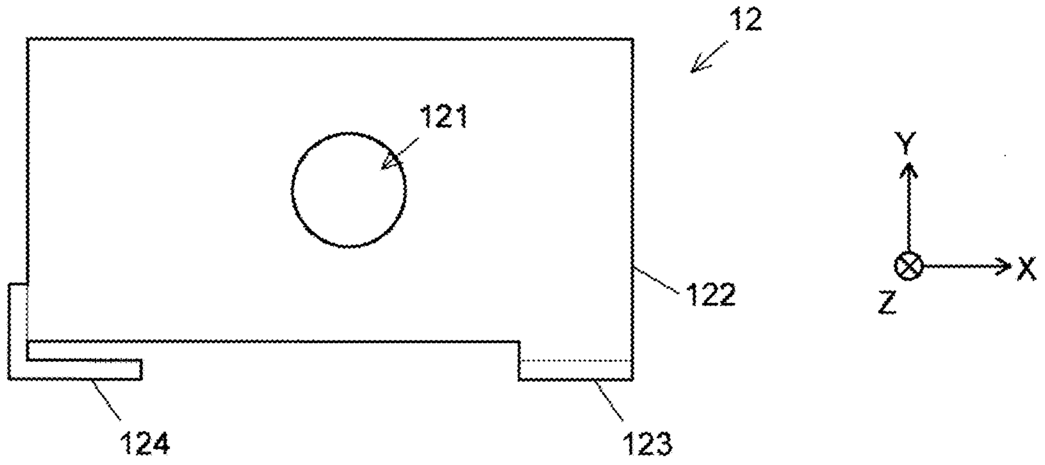
FIG. 6 is an X-Y plan view of a ground electrode in the present embodiment.
Figure 7:
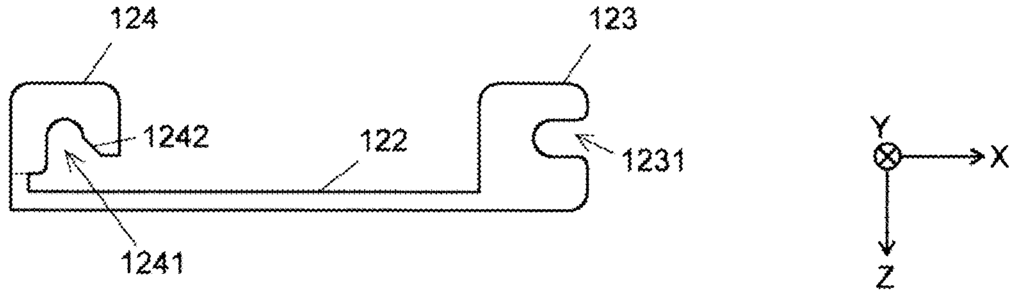
FIG. 7 is an X-Z side view of the auxiliary member in the present embodiment.
Figure 8:
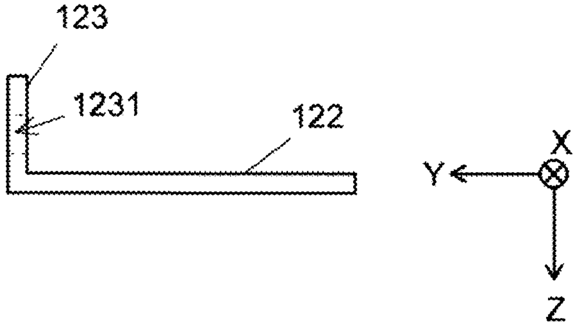
FIG. 8 is a Y-Z side view of the auxiliary member in the present embodiment.
Figure 9:
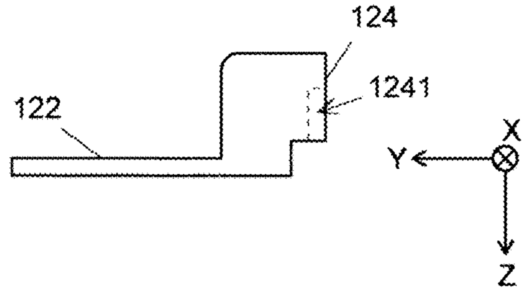
FIG. 9 is another Y-Z side view of the auxiliary member in the present embodiment.

Next, a configuration of the ground electrode 12 will be described. FIG. 6 is an X-Y plan view of the ground electrode 12, FIG. 7 is an X-Z side view of the ground electrode 12, FIG. 8 is a Y-Z side view of the ground electrode 12 as viewed from a right side of a paper surface of FIG. 6, and FIG. 9 is a Y-Z side view of the ground electrode 12 as viewed from a left side of the paper surface of FIG. 6. The ground electrode 12 is entirely made of a conductive material (for example, stainless steel).

The ground electrode 12 has a rectangular flat plate-shaped main body part 122 in which the opening part 121 is formed at the center. A first extension part 123 is extended to one end of one long side of the rectangular flat plate-shaped main body part 122, and a second extension part 124 is extended to a short side not adjacent to the one end.

The first extension part 123 is a flat plate-shaped small piece. In the first extension part 123, a U-shaped first notch 1231 opened toward the outside (a side opposite to a side where the opening part 121 is formed) is formed. The U-shaped first notch 1231 corresponds to a first concave part in the present invention.

The second extension part 124 is a member having an L shape when viewed from above, and a short side of the L shape is connected to the main body part 122. On a surface on a long side of the L shape, a J-shaped second notch 1241 opened in a direction vertically downward in a state where the ground electrode 12 is attached is formed. The J-shaped second notch 1241 corresponds to a second concave part in the present invention. The J-shaped second notch 1241 is shallower inward (on a side where the opening part 121 of the main body part 122 is formed), and an inclined part 1242 is provided obliquely downward.

Figure 10:
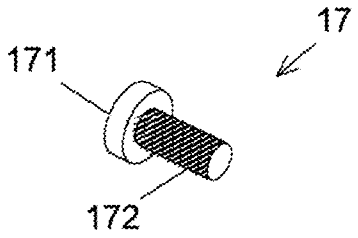
FIG. 10 is a perspective view of a pin member in the present embodiment.

As illustrated in FIG. 10, the pin member 17 includes a head part 171, and an insertion pin 172 connected to the head part 171 and having a screw thread. Each of the head part 171 and the insertion pin 172 is made of a conductive material (for example, stainless steel). For the pin member 17, for example, a knurled screw can be used.

Figure 11:
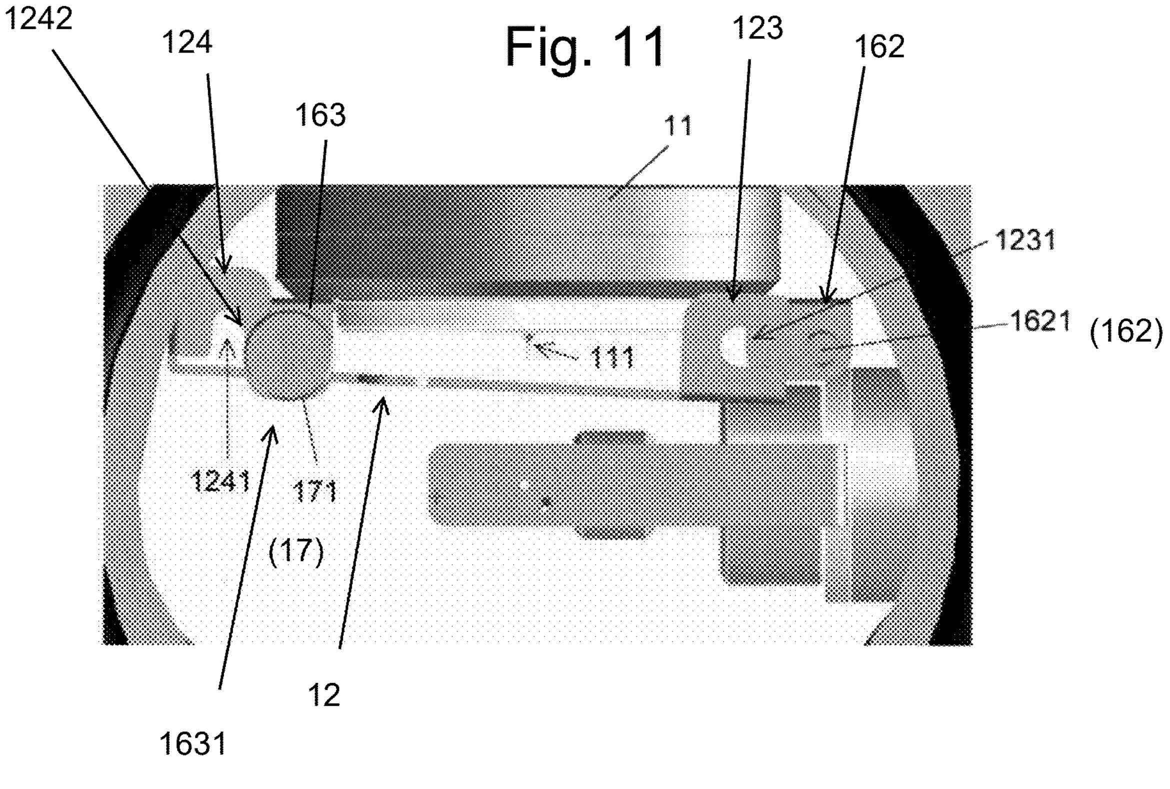
FIG. 11 is a diagram for explaining a state where the ground electrode is attached to the auxiliary member in the present embodiment.
Figure 12:
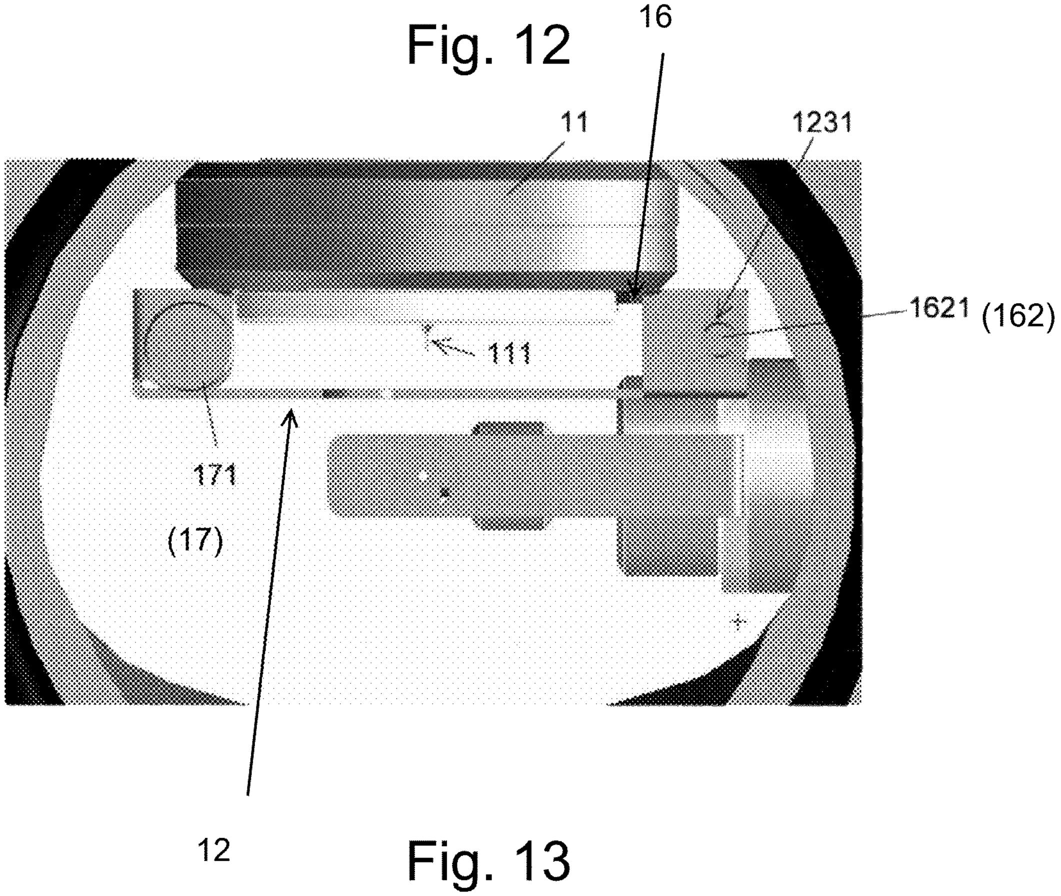
FIG. 12 is another diagram for explaining a state where the ground electrode is attached to the auxiliary member in the present embodiment.

Next, a procedure for attaching the ground electrode 12 to the auxiliary member 16 will be described with reference to FIGS. 11 and 12.

First, the insertion pin 172 of the pin member 17 is inserted and temporarily fixed to the opening part 1631 formed in the second extension part 163 of the auxiliary member 16. Subsequently, the ground electrode 12 is disposed so as to be located obliquely at an upper left of an attachment position of the ground electrode 12 on a paper surface of FIG. 11, and the inclined part 1242 formed in the second notch 1241 of the second extension part 124 of the ground electrode 12 is brought into contact with the insertion pin 172. Then, the ground electrode 12 is slid along the inclined part 1242.

The ground electrode 12 is slid to bring the first extension part 123 of the ground electrode 12 close to the fixing pin 1621 provided in the first extension part 162 of the auxiliary member 16, and the first notch 1231 formed in the first extension part 123 is inserted into the fixing pin 1621.

When the second notch 1241 formed in the second extension part 124 of the ground electrode 12 is inserted into the insertion pin 172 of the pin member 17, thereafter, the ground electrode 12 easily slides by its own weight along the inclined part 1242 provided in the second notch 1241, and stops in a state where an upper surface of the insertion pin 172 abuts on a top part of the second notch 1241. Further, similarly, an upper side surface of the first notch 1231 of the first extension part 123 of the ground electrode 12 comes into contact with the fixing pin 1621 due to the weight of the ground electrode 12. As a result, the ground electrode 12 is positioned in the X-Z plane with respect to the auxiliary member 16.

Thereafter, the head part 171 of the pin member 17 is rotated clockwise, and the second extension part 124 of the ground electrode 12 is pressed against and fixed to the second extension part 163 of the auxiliary member 16. Thus, the ground electrode 12 is also fixed in the Y-axis direction. When the head part 171 of the pin member 17 is rotated, if the second extension part 124 of the ground electrode 12 abuts on the head part 171, a force rotating clockwise is also applied to the ground electrode 12 in accordance with the rotation of the head part 171, and an upper end of the first notch 1231 of the first extension part 123 is fixed in a state of being pressed against the fixing pin 1621. Since the auxiliary member 16, the ground electrode 12, and the pin member 17 are all made of a conductive member, and the auxiliary member 16 is grounded, the ground electrode 12 fixed to the auxiliary member 16 is also grounded.

A conventionally known most common method for fixing a member such as the ground electrode of the present embodiment is to form a plurality of screw grooves in a member for fixing the ground electrode and to form the same number of openings as the screw grooves in the ground electrode, to align the ground electrode, and then to screw the ground electrode by inserting screws into the screw grooves from the respective openings. However, it is difficult to perform an operation of inserting a screw into a position of each screw groove and screwing the screw with a screwdriver or the like while holding a member (for example, a ground electrode) to be fixed in a narrow space like the ionization chamber 10.

As a method of fixing the member more easily than the above work, a method of forming a U-shaped notch opened in the same direction (for example, a horizontal direction) in the member is also known. In this case, screws are temporarily fixed to a plurality of positions where the member is fixed, U-shaped notches are inserted into the respective screws, and then the screws are tightly fastened. In this method, since the member is held in a state where each notch of the member to be fixed to the temporarily fixed screw is inserted, it is not necessary to screw the member while holding the member. Further, since the screw is temporarily fixed in advance, an operation of inserting the screw into the position of the screw groove is also unnecessary. Therefore, if this method is adopted, the work itself becomes easier than the most common method described above. However, in this method, the fixing position may be displaced depending on how much a user inserts the U-shaped notch into the screw. Therefore, reproducibility of the position where the ground electrode is fixed is poor.

On the other hand, in the present embodiment, since the first notch 1231 and the second notch 1241 opened in two different directions are configured to be inserted into the fixing pin 1621 and the insertion pin 172, respectively, and the second notch 1241 has a shape opened vertically downward, the positioning is performed in a state where the top part of the second notch 1241 abuts on the insertion pin and the upper side of the first notch 1231 abuts on the insertion pin 172. Therefore, the ground electrode 12 can be fixed with high reproducibility without causing a shift in the fixing position.

Further, since the second notch 1241 opened vertically downward is provided in the second extension part 124 of the ground electrode 12, due to the weight of the ground electrode 12 itself, the top part of the second notch 1241 abuts on the insertion pin 172 of the pin member 17, and the upper side of the first notch 1231 abuts on the insertion pin 172. Accordingly, even if the user releases his or her hand in this state, the position of the ground electrode 12 does not change. Therefore, workability when the ground electrode 12 is attached is also improved.

Furthermore, since the inclined part 1242 is provided in the second notch 1241, if the ground electrode 12 is slid along the inclined part 1242 after the second notch 1241 is inserted until the insertion pin 172 of the pin member 17 abuts on the inclined part 1242, the top part of the second notch 1241 can be moved as it is to a position where the top part abuts on the insertion pin 172, and the workability is further improved. Further, since the second notch 1241 is shallow inward, it is possible to slide the ground electrode 12 close to the auxiliary member 16 not from vertically above but from obliquely above. Therefore, even if there is no sufficient space vertically above the attachment position of the ground electrode 12 as in the present embodiment, the ground electrode 12 can be easily attached and detached.

The above described embodiment is merely examples, and can be appropriately modified in accordance with the spirit of the invention.

Figure 13:
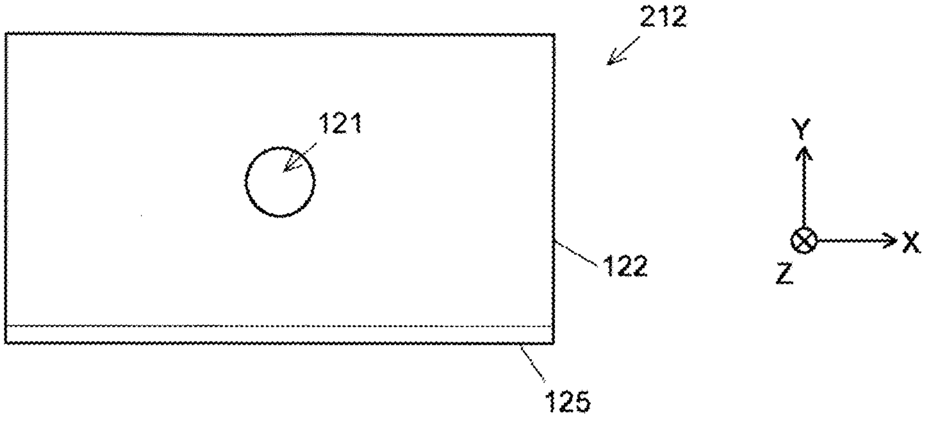
FIG. 13 is an X-Y plan view of a ground electrode according to a modification example.
Figure 14:
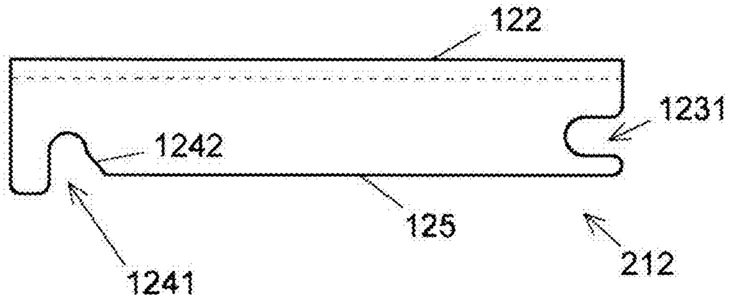
FIG. 14 is an X-Z side view of an auxiliary member according to the modification example.

In the above embodiment, the first extension part 162 and the second extension part 163 of the auxiliary member 16 are individually provided, and the first extension part 123 and the second extension part 124 of the ground electrode 12 are also individually provided, but these can be configured as a single extension part. FIGS. 13 and 14 illustrate a ground electrode 212 according to a modification example in which the first extension part 123 and the second extension part 124 of the ground electrode 12 are formed as a single extension part.

FIG. 13 is an X-Y plan view of the ground electrode 212, and FIG. 14 is an X-Z side view of the ground electrode 212. Parts corresponding to the respective parts of the ground electrode 12 of the above described embodiment described in FIGS. 6 and 7 are denoted by the same reference signs, and a detailed description thereof will be omitted.

In the ground electrode 212 of the modification example, one extension part 125 is formed vertically downward on a long side of a main body part 122, and a first notch 1231 and a second notch 1241 are provided at one end and the other end, respectively. The shapes of the first notch 1231 and the second notch 1241 are the same as those in the above embodiment. Also by using the ground electrode 212 having such a configuration, the ground electrode 212 can be fixed to an auxiliary member 16 in the same procedure as in the above embodiment.

Further, in the above embodiment, the screw (knurled screw) is used as the pin member 17. However, the pin member is not limited to the screw as long as the pin member has a function of pressing the notch 1231 of the ground electrode 12 against the fixing pin 1621 by the rotation of the member to position the ground electrode 12, a function of pressing the ground electrode 12 against the auxiliary member 16 to fix the ground electrode, and a function of grounding the ground electrode 12 through the auxiliary member 16. For example, a biasing member such as a spring made of a conductive material, which is rotatably attached to the auxiliary member 16 and pushes the ground electrode 12 toward the auxiliary member 16, may be used. However, since elasticity of a spring or the like may be lost in the case of being used in a place where a high temperature environment can occur as in the ground electrode of the above embodiment, it is preferable to use a screw similarly to the above embodiment.

Various configurations other than the ground electrode 12 of the above embodiment and the ground electrode 212 of the modification example can be adopted. Since these ground electrodes 12 and 212 are fixed such that the main body part 122 is horizontal, an extension part substantially perpendicular to the main body part 122 is provided, but the present invention can also be applied to a ground electrode to which the main body part 122 is fixed so as to be vertical.

Figure 15:
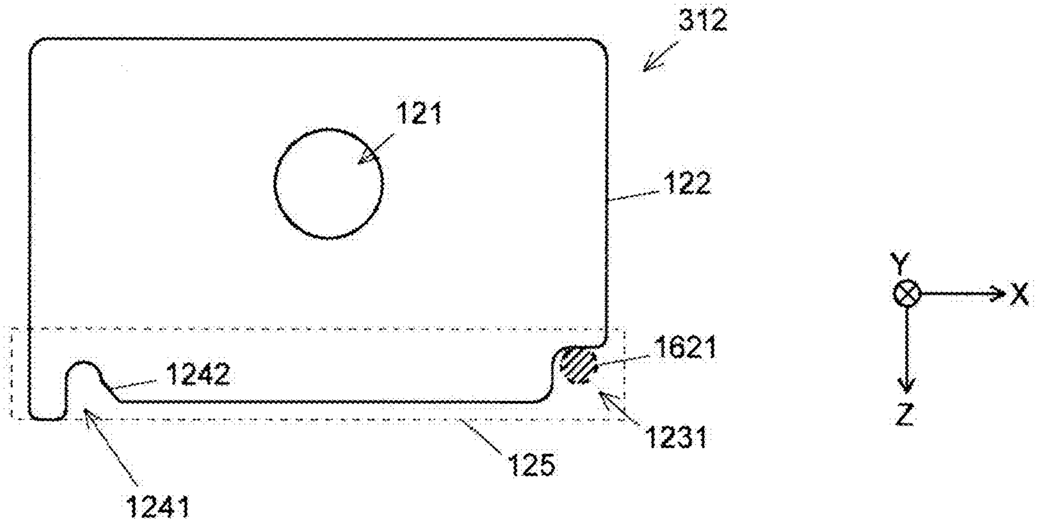
FIG. 15 is an X-Z front view of an auxiliary member according to still another modification example.

FIG. 15 is an X-Z front view of a ground electrode 312 according to another modification example in which a main body part 122 is vertically fixed. As in this example, in a case where the main body part 122 is fixed vertically, it is possible to provide an extension part that is placed on the same plane as the main body part 122. Further, as in the ground electrode 312 of this modification example, a first notch 1231 may have a shape opened in two directions of vertically downward and outward. Even when the ground electrode 312 including the first notch 1231 having such a shape is used, an upper part of the first notch 1231 can be positioned by abutting on a fixing pin 1621.

Any of the above embodiment and modification examples are examples in a case where the ground electrodes 12, 212, and 312 are fixed inside the ionization chamber 10, but the same configuration as described above can be used when various members that control the ion flow are fixed. Further, the same configuration as described above can be used for an ion analyzer other than the mass spectrometer, such as an ion mobility analyzer.

[Modes]

It is understood by those skilled in the art that the plurality of exemplary embodiments described above are specific examples of the following modes.

(Clause 1)

An ion analyzer according to a mode includes:

a first member fixed to an ion outflow port and provided with a fixing pin on one side and a pin hole on the other side sandwiching the ion outflow port;

a second member to be fixed to the first member, the second member including an ion flow controller configured to control movement of ions flowing out from the ion outflow port, the second member having a first concave part configured to engage with the fixing pin from a first direction perpendicular to an axis of the fixing pin, and a second concave part configured to engage with an insertion pin to be inserted into the pin hole from a second direction different from the first direction; and a pin member having the insertion pin to be inserted into the pin hole, and a head part configured to sandwich and fix the second concave part with the first member.

In the ion analyzer of Clause 1, the second member including the ion flow controller is attached to the first member fixed to the ion outflow port, and the movement of the ions flowing out from the ion outflow port is controlled by the ion flow controller. The ion flow controller is typically an electrode member. When the second member is attached to the first member, the insertion pin of the pin member is inserted into the pin hole of the first member in advance. Then, the first concave part of the second member is engaged with the fixing pin of the first member from the first direction perpendicular to the axis of the fixing pin, and the second concave part of the second member is engaged with the insertion pin of the pin member from the second direction different from the first direction. These engagements can be performed by one operation of sliding the second member close to the first member. Finally, the second concave part of the second member is sandwiched and fixed between the first member and the head of the pin member. In the ion analyzer of Clause 1, the first concave part of the second member is engaged with the fixing pin of the first member to be positioned in one direction, and the second concave part of the second member is engaged with the insertion pin of the pin member to be positioned in another direction. Then, by sandwiching and fixing the second concave part of the second member between the head part of the pin member and the first member, the positioning is performed in yet another direction that is not on the same plane as the above two directions. Therefore, the ion flow controller can be fixed with high position reproducibility.

Further, the second member can be easily attached only by sliding the second member close to the first member and fixing the second member with the pin member, and the second member can be easily detached only by loosening the pin member and sliding the second member to separate the second member from the first member.

(Clause 2)

In ion analyzer recited in Clause 1, the first member is a member fixed to an ionization probe, and the second member is a ground electrode including an opening through which a jet from the ionization probe passes.

The ion analyzer recited in Clause 1 can be suitably used in an ion analyzer including a ground electrode in which an opening through which a jet from the ionization probe passes is formed as in Clause 2.

(Clause 3)

In the ion analyzer recited in Clause 1 or Clause 2, the first concave part is a notch opened to a side opposite to a side where the second concave part is formed.

In the ion analyzer recited in Clause 3, the second member is slid with respect to the first member from the side opposite to the side where the second concave part is formed with respect to the first member, whereby the first concave part of the second member can be engaged with the fixing pin of the first member, and the second concave part of the second member can be engaged with the insertion pin of the pin member.

(Clause 4)

In the ion analyzer recited in any one of Clause 1 to Clause 3, the second concave part is a notch opened vertically downward in a state where the second member is attached to the first member.

In the ion analyzer of Clause 4, the second member is supported by the fixing pin of the first member in a state where the first concave part of the second member is engaged with the fixing pin of the first member, and the second concave part of the second member is engaged with the insertion pin of the pin member inserted into the pin hole of the first member. Therefore, it is possible to perform work of sandwiching and fixing the second concave part of the second member between the first member and the head part of the pin member with one hand.

(Clause 5)

In ion analyzer recited in any one of Clause 1 to Clause 4, the second concave part has a J-shaped notch formed shallower than an opposite side on a side where the first concave part is formed.

In the ion analyzer recited in Clause 5, since the notch of the second concave part has a J shape formed shallower than the opposite side on the side where the first concave part is formed, it is easy to engage with the insertion pin of the first member, and the operation can be performed more easily.

(Clause 6)

In the ion analyzer recited in any one of Clause 1 to Clause 5, the second concave part has a notch inclined downward in a state where the second member is attached to the first member on a side where the first concave part is formed.

In the ion analyzer recited in Clause 6, when the second concave part of the second member is engaged with the insertion pin of the pin member inserted into the pin hole of the first member, the second member can be slid along the inclination formed in the second concave part of the second member, so that the operation can be more easily performed.

REFERENCE SIGNS LIST

1 . . . Mass Spectrometer
10 . . . Ionization Chamber
11 . . . ESI Ionization Probe
111 . . . ESI Nozzle
112 . . . Assist Gas Nozzle
12, 212, 312 . . . Ground Electrode
121 . . . Opening Part
122 . . . Main Body Part
123 . . . First Extension Part
1231 . . . First Notch (First Concave Part)
124 . . . Second Extension Part
1241 . . . Second Notch (Second Concave Part)
1242 . . . Inclined Part
125 . . . Extension Part
13 . . . Push Electrode
14 . . . Convergence Electrode
141 . . . Opening Part
15 . . . Heated Capillary
16 . . . Auxiliary Member
161 . . . Main Body Part
1611 . . . Opening Part
162 . . . First Extension Part
1621 . . . Fixing Pin
163 . . . Second Extension Part
1631 . . . Opening Part
17 . . . Pin Member
171 . . . Head Part
172 . . . Insertion Pin

The invention claimed is:

1. An ion analyzer comprising:

a first member fixed to an ion outflow port and provided with a fixing pin on one side and a pin hole on the other side sandwiching the ion outflow port;

a second member to be fixed to the first member, the second member including an ion flow controller configured to control movement of ions flowing out from the ion outflow port, the second member having a first concave part configured to engage with the fixing pin from a first direction perpendicular to an axis of the fixing pin, and a second concave part configured to engage with an insertion pin from a second direction different from the first direction, the insertion pin being inserted into the pin hole; and a pin member having the insertion pin to be inserted into the pin hole, and a head part configured to sandwich and fix the second member with the first member.

2. The ion analyzer according to claim 1, wherein the first member is a member fixed to an ionization probe, and the second member is a ground electrode including an opening through which a jet from the ionization probe passes.

3. The ion analyzer according to claim 1, wherein the first concave part is a notch opened on a side opposite to a side where the second concave part is formed.

4. The ion analyzer according to claim 1, wherein the second concave part is a notch opened vertically downward in a state where the second member is attached to the first member.

5. The ion analyzer according to claim 1, wherein the second concave part has a J-shaped notch, the J-shaped notch being formed shallower than a notch of an opposite side where the first concave part is formed.

6. The ion analyzer according to claim 1, wherein the second concave part has a notch inclined downward in a state where the second member is attached to the first member on a side where the first concave part is formed.

7. The ion analyzer according to claim 1, wherein the first concave part and the second concave part are configured to engage with the fixing pin and the insertion pin respectively, by sliding the second member in a direction intersecting axes of the fixing pin and the insertion pin.

* * * * *